(12) United States Patent
Jung et al.

(10) Patent No.: US 11,373,547 B2
(45) Date of Patent: Jun. 28, 2022

(54) TACTILE DISPLAY TABLET

(71) Applicants: Power Contents Technology Co., Ltd., Seongnam-si (KR); GACHON UNIVERSITY-INDUSTRY FOUNDATION, Seongnam-si (KR)

(72) Inventors: Jung Il Jung, Seoul (KR); Jin Soo Cho, Seoul (KR)

(73) Assignees: Power Contents Technology Co., Ltd., Seongnam-si (KR); GACHON UNIVERSITY-INDUSTRY FOUNDATION, Seongnam-si (KR)

( * ) Notice: Subject to any disclaimer, the term of this patent is extended or adjusted under 35 U.S.C. 154(b) by 323 days.

(21) Appl. No.: 16/790,491

(22) Filed: Feb. 13, 2020

(65) Prior Publication Data

US 2020/0312187 A1    Oct. 1, 2020

Related U.S. Application Data

(60) Provisional application No. 62/823,295, filed on Mar. 25, 2019.

(51) Int. Cl.
*G09B 21/00*    (2006.01)
(52) U.S. Cl.
CPC ................. *G09B 21/004* (2013.01)

(58) Field of Classification Search
CPC .................................................. G09B 21/004
See application file for complete search history.

(56) References Cited

U.S. PATENT DOCUMENTS

| | | | | |
|---|---|---|---|---|
| 10,845,880 B2 * | 11/2020 | Cho | ....................... | G06F 3/016 |
| 10,845,882 B2 * | 11/2020 | Jung | ................... | G09B 21/005 |
| 10,866,643 B2 * | 12/2020 | Cho | .................... | G06F 3/04895 |
| 10,891,875 B2 * | 1/2021 | Cho | ..................... | G09B 21/003 |

* cited by examiner

*Primary Examiner* — Vinh T Lam
(74) *Attorney, Agent, or Firm* — Studebaker & Brackett PC

(57) ABSTRACT

Provided is a tactile display tablet capable of stably and fast driving a braille display, which includes: a control unit generating a tactile map including information on entire tactile pixels based on output data of a connected user terminal or output data of a self-driven application; a tactile divider unit extracting differential data on the tactile map based on a difference between a tactile map currently received from the control unit and a previously received tactile map, and generating first division differential maps by dividing the differential data; a first slave unit configured to generate second division differential maps by dividing the first division differential maps; a second slave unit generating third division differential maps by dividing the second division differential maps; and a third slave unit for implementing a tactile display according to the entire tactile pixels based on the third division differential maps.

5 Claims, 8 Drawing Sheets

TACTILE DISPLAY TABLET

CROSS-REFERENCE TO RELATED APPLICATIONS

This application claims priority based on provisional application No. 62/823,295, filed on Mar. 25, 2019, the contents of which is incorporated by reference in their entireties.

BACKGROUND OF THE INVENTION

1. Field of the Invention

The present invention relates to a tactile display tablet, and more particularly, to a tactile display tablet capable of stably and rapidly driving a braille display.

2. Description of the Related Art

It is essential to acquire and utilize information using computers in the information society, and the trend is also applied to the visually impaired as well as ordinary people.

In order to improve an information level of the visually impaired, it is necessary to allow the visually impaired to learn and use information at a level similar to the level of the ordinary people. This is important because it allows the visually impaired to make usual lives convenient, and to learn and use the information for themselves. In addition, it may be very important in that this ultimately leads to provide various educational opportunities for the visually impaired, thereby expanding opportunities for entering and participating the society, so that welfare for the visually impaired can be improved.

However, the current major way of using a computer is that visual information outputted from a monitor is visually recognized and information for the outputted visual information is inputted by using an input tool such as a keyboard, a mouse, or a touch pad. Accordingly, the visually impaired who are not able to use vision have a big limitation in recognizing computer-outputted information at a level similar to the level of ordinary people and interacting with the information immediately. As a result, the visual impairment significantly reduces the efficiency of computer use, thereby significantly depriving the visually impaired of opportunities to acquire and use information through the computer.

In order to solve the difficulty in using the computer of the visually impaired, various technologies have been developed to enable recognition of visual information and interaction with a computer by using hearing, touch or the like. A representative technology is a screen reader that assists the visually impaired to use the computer through hearing. The screen reader is a device or software for assisting to use the computer by outputting contents displayed on a computer screen and keyboard information inputted by the user, into a voice.

However, because the screen reader searches graphical user interface (GUI) elements of an output screen by using only linearized information formed of one line without two-dimensional spatial position information with respect to the output screen, there is a difficulty in recognizing the screen output information. In particular, the more information contained on the output screen, the significantly greater the difficulty. In addition, because the screen reader only provides a text-based simple descriptive explanation with voice with respect to various graphic information such as pictures and diagrams other than characters or the GUI elements, the visually impaired has big difficulty to understand and interact with the graphic information.

Another related art is a braille information terminal which delivers character information through a braille cell in the tactile sensation. Most of the braille information terminals operate the braille cell operation unstably, and thus the operating speed of the braille cell is not immediate. In addition, there is a limit in increasing the number of pixels of the braille cell.

(Patent Document 1) Korean Patent Publication No. 10-2012-0063982

SUMMARY OF THE INVENTION

An object of the present invention is to provide a tactile display tablet capable of a stable and fast drive of a braille display. To solve the above problem, one embodiment of the present invention provides a tactile display tablet including a processor, a memory, a communication module, and an input/output unit, and including: a control unit configured to generate a tactile map including information on entire tactile pixels, based on output data of a connected user terminal or output data of a self-driven application; a tactile divider unit configured to extract differential data on the tactile map based on a difference between a tactile map currently received from the control unit and a previously received tactile map, and generate a plurality of first division differential maps by dividing the differential data; a first slave unit configured to generate a plurality of second division differential maps by dividing the first division differential maps; a second slave unit configured to generate a plurality of third division differential maps by dividing the second division differential maps; and a third slave unit configured to implement a tactile display according to the entire tactile pixels based on the third division differential maps, wherein, when the number of pixels of the entire tactile pixels is N*I, the number of pixels of the first division differential map is N*J, the number of pixels of the second division differential map is K*J, N, I, J, and K are natural numbers, I is greater than J, and N is greater than K. In one embodiment of the present invention, the third slave unit may include: the third slave substrate; a third slave port configured to receive the third division differential map from the second slave unit; a plurality of signal supply units configured to transmit a plurality of TULA drive signals divided from the third division differential map; a plurality of TULA modules configured to implement a plurality of tactile pixels according to each of the TULA drive signals. In one embodiment of the present invention, the third slave unit may include: a TULA support configured to support a lower side of the TULA modules; a first fixing guide combined with the TULA support and having a plurality of through-holes configured to guide a lower portion of a physical member for implementing the tactile pixels of the TULA module; and a second fixing guide disposed above the first fixing guide and having a plurality of through-holes configured to guide an upper portion of the physical member for implementing the tactile pixels of the TULA module. In one embodiment of the present invention, the fixing guide is formed on one side surface thereof with at least one first groove and the other side surface thereof with at least one first protrusion corresponding to a shape of the first groove, the second fixing guide formed on one side surface thereof with at least one second groove, the other side surface thereof with at least one first protrusion corresponding to a shape of the first groove, two adjacent first fixing guides may be attached to and detached from each other by the first groove and the first protrusion, and two adjacent second fixing guides may be attached to and detached from each other by the second groove and the second protrusion.

In one embodiment of the present invention, the TULA module may include: a plurality of pin drive modules; a pin drive module fixing portion configured to support the pin drive modules; and a pin drive signal supply unit supported by the pin drive module fixing portion to receive the TULA drive signal and transmit a pin drive signal to each of the pin drive modules based on the TULA drive signal. The tactile display tablet according to one embodiment of the present invention can enable the visually impaired to intuitively perceive tactile displayed articles in real time. The tactile display tablet according to one embodiment of the present invention can enable the visually impaired to perceive information in a tactile manner and simultaneously perform an input based on the perceived information. The tactile display tablet according to one embodiment of the present invention can implement stable braille pixels having higher resolution. The tactile display tablet according to one embodiment of the present invention can implement the stable and fast drive of the braille display, and can smoothly operate an application such as an image viewer and a game.

In addition, the tactile display tablet according to the present invention can improve the computer literacy ability of the visually impaired and expand the market of computer hardware and software for the visually impaired.

DETAILED DESCRIPTION OF THE INVENTION

Figure 1:
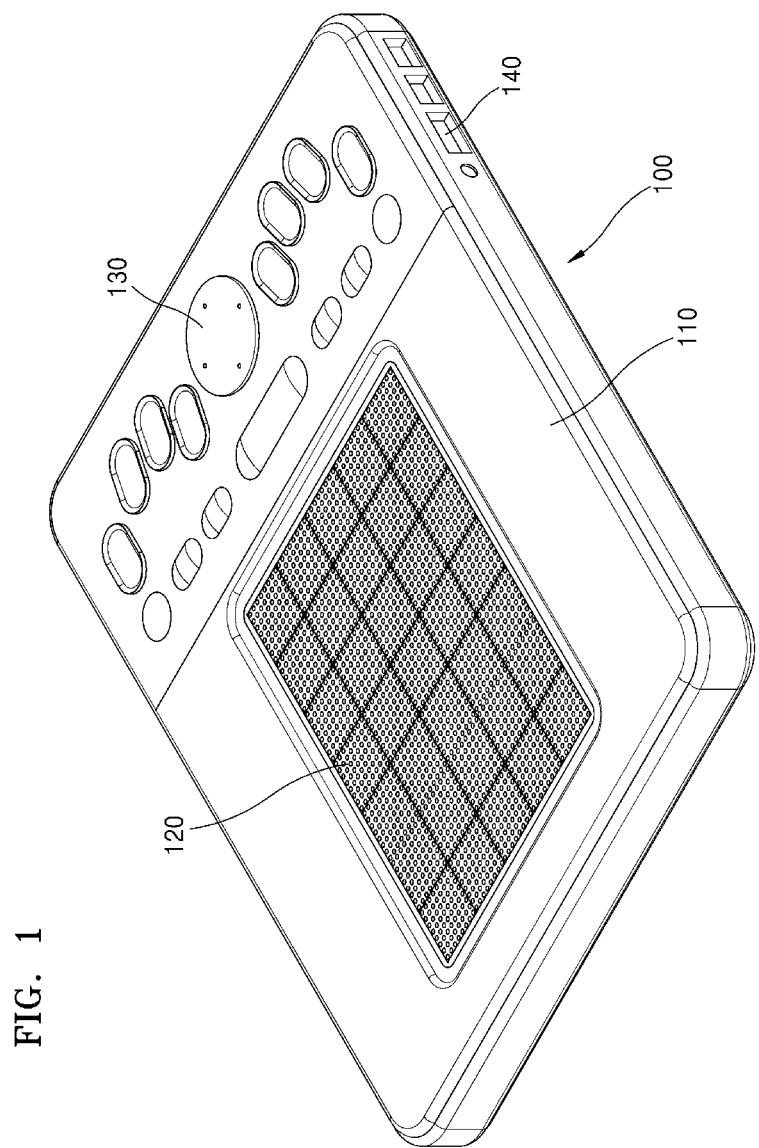
FIG. 1 schematically shows an appearance of a tactile display tablet according to one embodiment of the present invention.

FIG. 1 schematically shows an appearance of a tactile display tablet according to one embodiment of the present invention.

Figure 2:
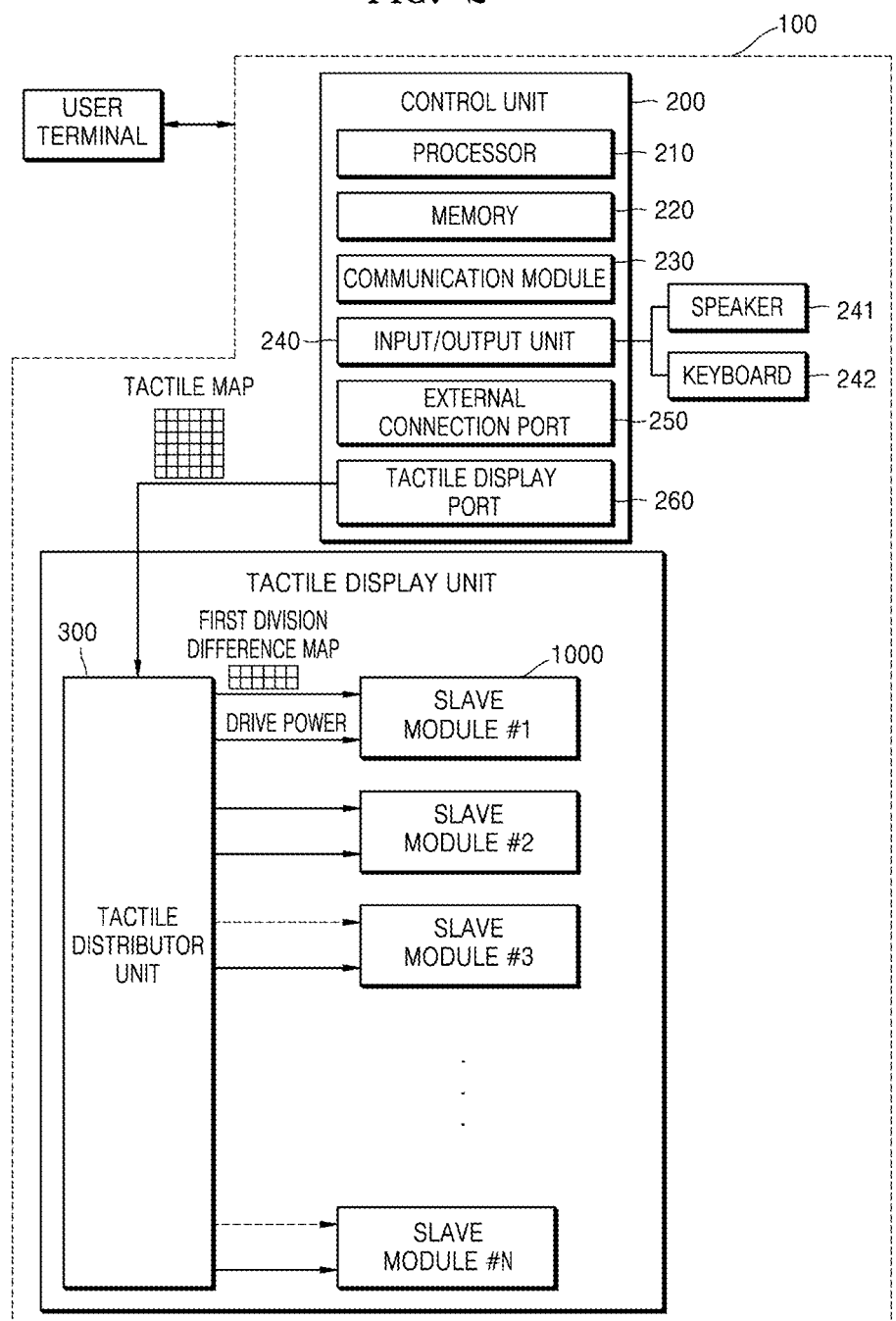
FIG. 2 schematically shows an internal configuration of a tactile display tablet according to one embodiment of the present invention.

FIG. 2 schematically shows an internal configuration of a tactile display tablet according to one embodiment of the present invention.

Figure 3:
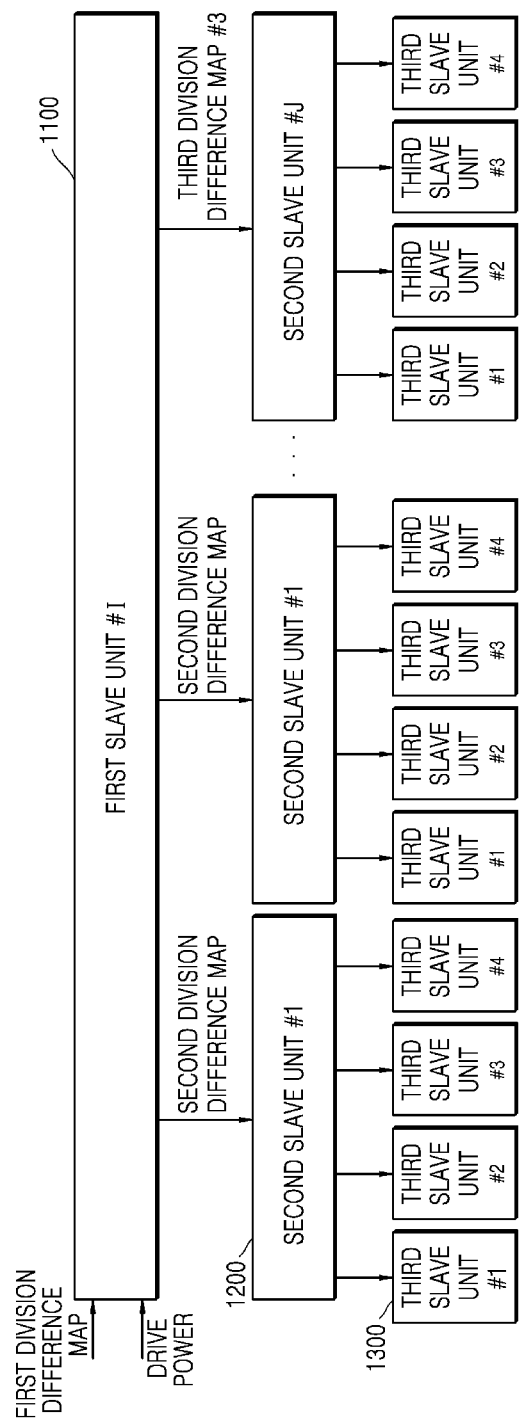
FIG. 3 schematically shows an internal configuration of a slave module according to one embodiment of the present invention.

FIG. 3 schematically shows an internal configuration of a slave module according to one embodiment of the present invention.

Figure 4:
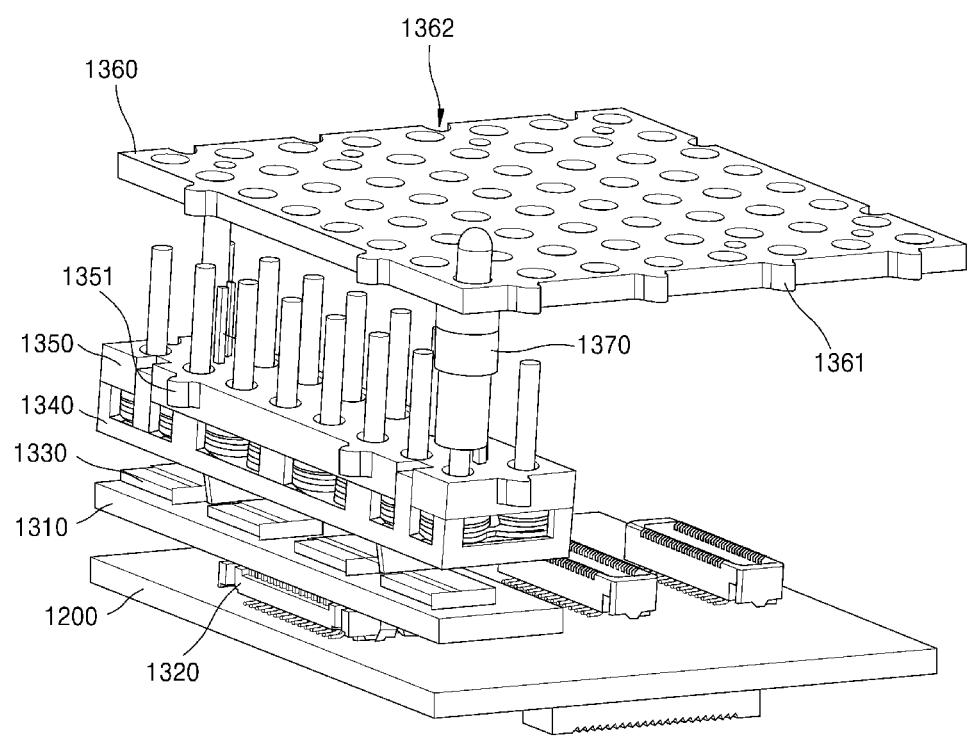
FIG. 4 schematically shows a second slave unit and a third slave unit according to one embodiment of the present invention.

FIG. 4 schematically shows a second slave unit and a third slave unit according to one embodiment of the present invention.

Figure 5:
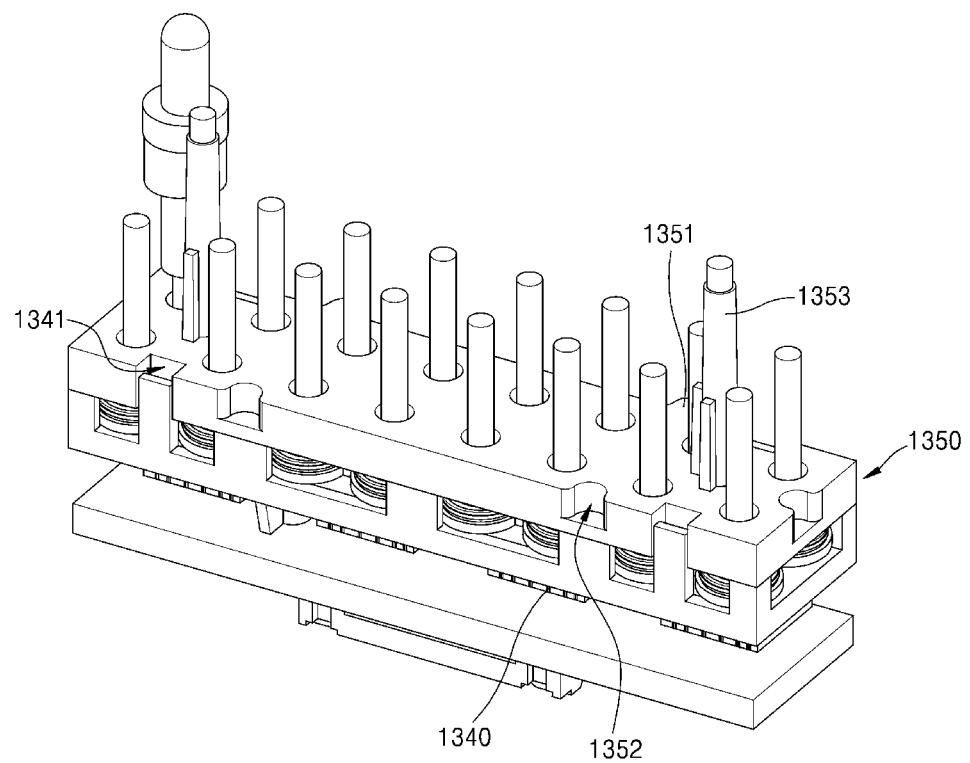
FIG. 5 schematically shows a third slave unit according to one embodiment of the present invention.

FIG. 5 schematically shows a third slave unit according to one embodiment of the present invention.

Figure 6A:
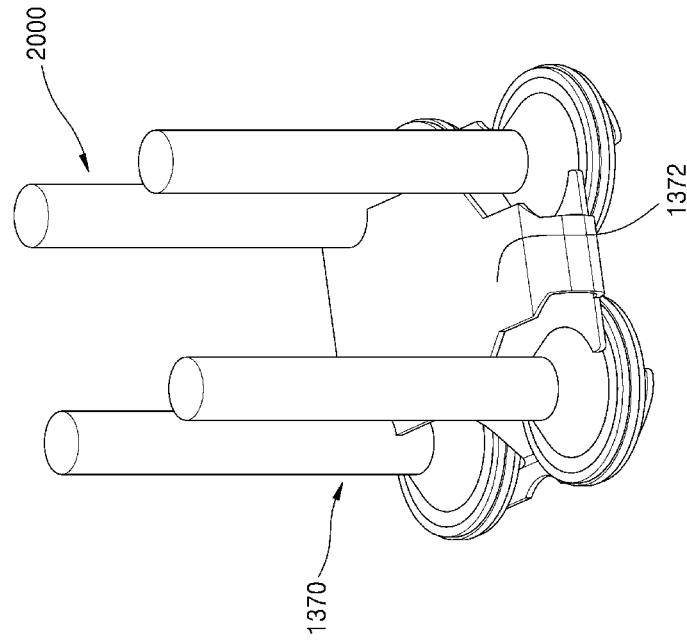
FIGS. 6A and 6B schematically show a TULA module according to one embodiment of the present invention.
Figure 6B:
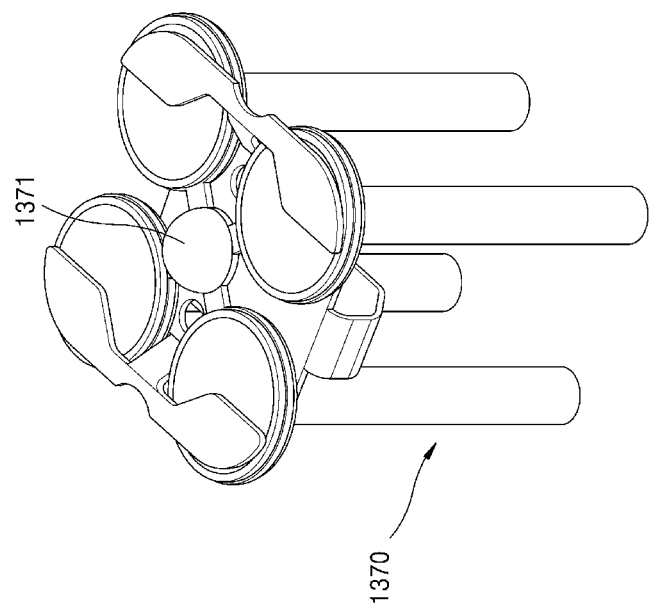

FIGS. 6A and 6B schematically show a TULA module according to one embodiment of the present invention.

Figures 7A, 7B, 7C:
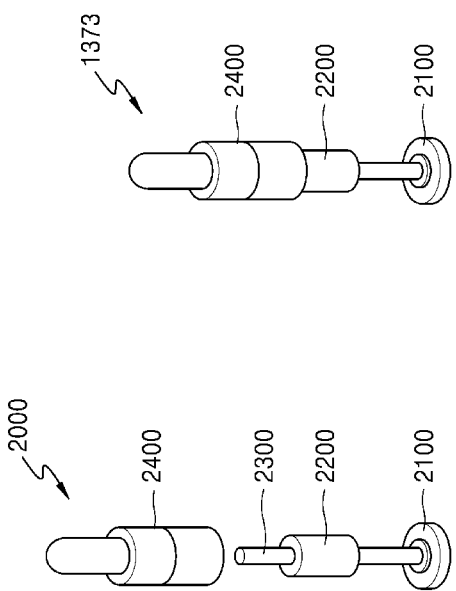
FIGS. 7A to 7C schematically show a pin drive module according to one embodiment of the present invention.

FIGS. 7A to 7C schematically show a pin drive module according to one embodiment of the present invention.

Figure 8:
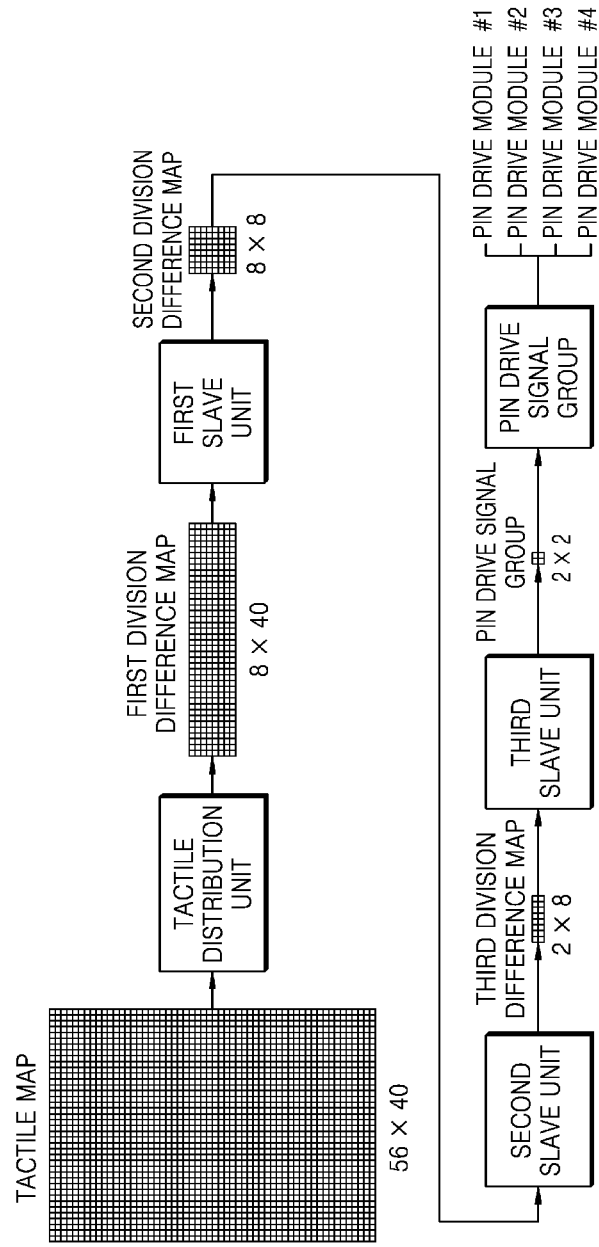
FIG. 8 schematically shows a conversion process from a tactile map to a pin drive module signal according to one embodiment of the present invention.

FIG. 8 schematically shows a conversion process from a tactile map to a pin drive module signal according to one embodiment of the present invention.

DETAILED DESCRIPTION OF THE INVENTION

Hereinafter, various embodiments and/or aspects will be described with reference to the drawings. In the following description, numerous specific details are set forth in order to provide a thorough understanding of one or more aspects for the purpose of explanation. However, it shall also be appreciated by those having ordinary skill in the art that such aspect(s) may be carried out without the specific details. The following description and accompanying drawings will be set forth in detail for specific illustrative aspects among one or more aspects. However, the aspects are merely illustrative and some of various ways among principles of the various aspects may be employed, and the descriptions set forth herein are intended to include all the various aspects and equivalents thereof.

FIG. 1 schematically shows an appearance of a tactile display tablet 100 according to one embodiment of the present invention.

The tactile display tablet 100, externally, includes: a case 110; a braille display unit 120 implemented by braille cells corresponding to a plurality of tactile pixels; a keypad 130 configured to allow a visually impaired person and so on to perform a key input; and an external connection port 140 connected to an external device. Internal electronic elements of the tactile display are disposed inside the case 110.

The tactile display tablet 100 may receive an input by the keypad 130 from the user, and may provide display information to the visually impaired user by the braille display unit 120 formed of braille cells instead of a visual display.

FIG. 2 schematically shows an internal configuration of the tactile display tablet 100 according to the embodiment of the present invention.

The tactile display tablet 100 may be connected to a user terminal to perform data transmission and reception with the user terminal and perform an input/output interface for the visually impaired of an application executed in the user terminal, or perform an input/output of an application operated in the tactile display tablet 100 without access to the user terminal.

Specifically, the control unit 200 includes a processor 210, a memory 220, a communication module 230, an input/output unit 240, an external connection port 250, and a tactile display port 260. The processor 210 and/or the memory 220 of the above control unit 200 generates a tactile map including information on the entire tactile cells displayed in the tactile display unit in a tactile manner, based on output data of a connected user terminal or output data of a self-driven application.

The control unit 200 may be implemented by a computing module formed of one single substrate.

The communication module 230 is configured to wirely or wirelessly communicate with the user terminal or the like. The input/output unit 240 may be connected to a connected speaker 241 or keyboard 242.

The external connection port 250 may correspond to a port configured to perform various types of wired connection such as a USB standard.

Meanwhile, the control unit 200 transmits the tactile map to the tactile display unit through the tactile display port 260.

The tactile display unit includes a tactile distributor unit 300 and a plurality of slave modules 1000 configured to implement zone-specific braille cells based on data received from the tactile distributor unit 300. Specifically, the tactile distributor unit 300 extracts differential data on the tactile map based on a difference between a tactile map currently received from the control unit 200 and a previously received tactile map, and generates a plurality of first division differential maps by dividing the differential data.

For example, when assumed that Table 1 below is a tactile map of a previous frame at 3*3 pixels, and Table 2 is a tactile map of a current frame at 3*3 pixels, differential data of the current tactile map is shown in Table 3.

TABLE 1

| | | |
|---|---|---|
| 1 | 1 | 1 |
| 1 | 1 | 0 |
| 1 | 1 | 0 |

TABLE 2

| | | |
|---|---|---|
| 1 | 1 | 1 |
| 1 | 0 | 0 |
| 1 | 0 | 0 |

TABLE 3

| | | |
|---|---|---|
| | | |
| | 0 | |
| | 0 | |

Herein, it is assumed that 0 is a state in which a braille pin of the slave module 1000 is down, and 0 is a state in which the braille pin is up.

In other words, the differential data of the tactile map corresponds to data on the difference between the tactile map in the previous frame and the tactile map in the current frame. Only the braille pins having fluctuations are controlled by using the above differential data, instead of controlling braille pins for every frame, so that the braille pin can be controlled faster, and a lifespan of the braille pin can increase.

Meanwhile, the tactile distributor unit 300 divides the differential data of the tactile map over each area based on to a predetermined rule, and generates a first division differential map to transmit the first division differential map to each slave module 1000. Then, the slave module 1000 may implement the tactile pixels by moving the braille pins according to each received first division differential map. The tactile distributor unit 300 may be implemented by an FPGA, and the tactile distributor unit 300 may transmit the first division differential map to the slave modules 1000 implementing the tactile pixels for each area in parallel, so that the braille pins for each area can be driven at the same timing.

FIG. 3 schematically shows an internal configuration of each of the slave modules 1000 according to one embodiment of the present invention.

The slave module 1000 includes: a first slave unit 1100 configured to generate a plurality of second division differential maps by dividing the first division differential map; a second slave unit 1200 configured to generate a plurality of third division differential maps by dividing the second division differential maps; and a third slave unit 1300 configured to implement a tactile display according to the entire tactile pixels based on the third division differential maps. The first division differential map is divided into a plurality of second division differential maps by the first slave unit 1100, and each of the second division differential maps is divided into a third division differential maps by each second slave unit 1200.

Each of the first slave unit 1100 and the second slave unit 1200 includes a separate driver configured to divide the differential map. According to the above configuration, braille pins of the entire tactile pixels may be driven at a uniform timing instead of driving the braille pin of a specific tactile pixel first.

Preferably, when the number of pixels of the entire tactile pixels is N*I, the number of pixels of the first division differential map is N*J, I/J first division differences are provided, the number of pixels of the second division differential map is K*J, N/K second division differences are provided, N, I, J, and K are natural numbers, I is greater than J, and N is greater than K.

Instead of performing the differential data of the tactile maps for the entire tactile pixels by one driver and one module, the differential data of the tactile map is divided by the slave module 1000 capable of a plurality of individual operations, and the braille pins are driven by the differential data of the finally divided tactile map, so that the operation of the braille pin can be implemented at a more uniform timing.

FIG. 4 is schematically shows a second slave unit 1200 and a third slave unit 1300 according to one embodiment of the present invention. FIG. 4 only shows a part of the third slave unit 1300 for further understanding of a structure of the third slave unit 1300, and omits some components of cap portions of some pin drive modules 2000.

For example, in the embodiment in FIG. 4, the second division differential map has tactile pixels of 8*8, and the third division differential map has tactile pixels of 2*8.

The second slave unit 1200 includes: divides the second division differential map received from the first slave unit 1100 to transfer the divided division differential maps to the third slave units 1300, respectively.

The third slave unit 1300 a third slave substrate 1310; a third slave port 1320 configured to receive the third division differential map from the second slave unit 1200; a plurality of signal supply units 1330 configured to transmit a plurality of TULA drive signals divided from the third division differential map; a plurality of TULA modules 1370 configured to implement a plurality of tactile pixels according to each of the TULA drive signals; a TULA support 1340 configured to support a lower side of the TULA module; a first fixing guide 1350 coupled to the TULA support and having a plurality of through-holes configured to guide a lower portion of a physical member for implementing the tactile pixels of the TULA module; and a second fixing guide 1360 disposed above the first fixing guide and having a plurality of through-holes configured to guide an upper portion of the physical member for implementing the tactile pixels of the TULA module. Operation of the braille pins can be stably performed in the TULA module 1370 by using the first fixed guide 1350 and the second fixed guide 1360, and the lifespan of the pin drive module 2000 of the TULA module 1370 can elongate.

Preferably, at least one first groove 1352 may be formed on one side surface of the first fixing guide 1350, at least one first protrusion 1351 corresponding to a shape of the first groove may be formed on the other side surface thereof, at least one second groove 1362 may be formed on one side surface of the second fixing guide 1360, and at least one second protrusion 1361 corresponding to the second groove may be formed on the other side surface thereof.

According to the above structure, two adjacent first fixing guides 1350 may be attached to and detached from each other by the first groove 1352 and the first protrusion 1351, and two adjacent second fixing guides 1360 may be attached to and detached from each other by the second groove 1362 and the second protrusion 1361.

The pin drive module 2000 of the TULA module 1370 involves physical driving, unlike pixels in a general visual display, and tactile pixels may not be smoothly implemented in some areas when used for a long period.

Upon the above embodiment, when the tactile pixels of some area are not implemented, at least one of the first slave unit 1100, the second slave unit 1200, and the third slave unit 1300 implementing the corresponding areas may be easily disassembled and the corresponding pin drive module 2000 may be easily replaced, so that only local parts can be replaced instead of replacing the entire tactile display. In addition, since the first fixing guide 1350 and the second fixing guide 1360 may be easily detached from each other, a damaged fixing guide can be easily replaced. In addition, even when the pin drive module 2000 is replaced, only the first fixing guide 1350 and the second fixing guide 1360 are removed in the corresponding area, so that the pin drive module 2000 can be replaced. FIG. 5 schematically shows a third slave unit 1300 according to one embodiment of the present invention.

As shown in FIG. 5, the TULA support 1340 is formed with a plurality of support protrusions 1341 having a shape of a protruding member, and the first fixing guide 1350 is formed with a support-coupling groove 1354 to which the support protrusion 1341 may be coupled. In the above structure, after the TULA module 1370 is disposed on an upper side of the TULA support 1340, the first fixing guide 1350 may be coupled to the TULA support 1370 such that a part of the TULA module 1370 is covered with the first fixing guide 1350.

FIGS. 6A and 6B schematically show a TULA module 1370 according to one embodiment of the present invention.

The TULA module may implement a plurality of braille pins. Specifically, the TULA module includes: a plurality of pin drive modules 2000; a pin drive module fixing portion 1372 configured to support the pin drive modules 2000; and a pin drive signal supply unit 1371 supported by the pin drive module fixing portion 1372 to receive the TULA drive signal and transmit a pin drive signal to each of the pin drive modules 2000 based on the TULA drive signal. The TULA module 1370 having a form shown in FIGS. 6A and 6B configured to implement four braille pins. The TULA drive signal includes an electrical signal for driving four pin drive modules 2000, and the pin drive signal supply unit 1371 supplies a control signal or control power to each pin drive module 2000 from the received TULA drive signal.

FIGS. 7A to 7C schematically show the pin drive module 2000 according to one embodiment of the present invention.

Hereinafter, embodiments of the pin drive module 2000 shown in FIGS. 7A and 7B will be described.

As shown in FIG. 7A, the pin drive module 2000 includes: a transducer 2100 configured to convert a vibration motion into a linear motion; a shaft 2300 connected to the transducer; a moving body 2200 vertically movable in an axial direction of the shaft 2300 on the shaft 2300; and a TULA cap 2400 movable according to a movement of the moving body 2200. Preferably, the transducer 2100 may include a plurality of piezoelectric ceramics and elastic bodies, move the moving body 2200 vertically by converting the vibration due to expansion/contraction of the piezoelectric ceramic into linear motion when power is applied, and control the movement of the moving body 2200 by controlling the transducer.

FIG. 7C is a sectional view showing an example of the pin drive module 2000 according to one embodiment of the present invention.

As shown in FIGS. 6A and 6B, the transducer 2100 of the pin drive module 2000 includes a housing 1231.1; a first piezoelectric ceramic 2110 and a second piezoelectric ceramic 2130 disposed inside the housing 1231.1; and an elastic member 2120 disposed between the first piezoelectric ceramic and the first piezoelectric ceramic 2130.

Meanwhile, the moving body 2200 includes a moving main body 1233.1 and a rubber ring 2210 disposed inside the moving main body 1233.1.

In the above structure, the vertical movement of the moving body 2200 may be efficiently controlled by controlling voltages applied to the first piezoelectric ceramic 2110 and the second piezoelectric ceramic 2130 of the transducer 2100.

The pin drive module shown in FIGS. 7A to 7C is described merely as one embodiment of the present invention, and various piezoceramic-based pin drive modules may be used in the present invention.

FIG. 8 schematically shows a conversion process from the tactile map to a signal of the pin drive module 2000 according to one embodiment of the present invention.

For easier understanding, it is assumed that entire tactile pixels of the tactile map shown in FIG. 8 are 56*40. The tactile map of 56*40 is divided into seven first division differential maps of 8*40 pixels in the tactile distributor unit. Then, each of first division differential maps is divided into second division differential maps of 8*8 pixels by the first slave unit 1100. Then, each of the second division differential maps is divided into third division differential maps of 2*8 by the second slave unit 1200.

Then, the third slave unit 1300 generates four pin drive signals capable of driving pin drive module 2000 of 2*2 from the third division differential map of 2*8. The pin drive signals are supplied to the four pin drive modules 2000 through pin drive signal supply units 1371, respectively, so that the pin drive modules 2000 implement braille pins, thereby implementing the tactile pixels.

In other words, when the number of pixels of the entire tactile pixels is N*I, the number of pixels of the first division differential map is N*J, the number of pixels of the second division differential map is K*J, N, I, J, and K are natural numbers, I is greater than J, and N is greater than K.

Further, the various aspects or features described herein may be implemented as a method, an apparatus, or an article of manufacture using standard programming and/or engineering techniques. In addition, the steps and/or operations of the method or algorithm described in terms of aspects disclosed herein may be implemented directly in hardware, and in a software module executed by a processor, or in a combination thereof. In addition, in some aspects, the steps or operations of the method or algorithm may be present as at least one or any combination of sets of codes or instructions in a machine-readable medium or computer-readable medium, and may be integrated as a computer programmable thing. The term "article of manufacture" used herein is intended to include a computer program accessible from any suitable computer-readable device or medium.

The descriptions of the described embodiments are provided to enable any person having ordinary skill in the art to use or execute the present invention. It shall be apparent to the person having ordinary skill in the art that various modifications are available for the embodiments, and general principles defined herein may be applied to other embodiments without departing from the scope of the present invention. Accordingly, the present invention should not be limited to the embodiments set forth herein but should be construed in the broadest scope consistent with the principles and novel features set forth herein.

What is claimed is:

1. A tactile display tablet comprising:
   a control unit including a processor, a memory, a communication module, and an input/output unit, and configured to generate a tactile map including information on entire tactile pixels based on output data of a connected user terminal or output data of a self-driven application;
   a tactile divider unit configured to extract differential data on the tactile map based on a difference between a tactile map currently received from the control unit and a previously received tactile map, and generate a plurality of first division differential maps by dividing the differential data;
   a first slave unit configured to generate a plurality of second division differential maps by dividing the first division differential maps;
   a second slave unit configured to generate a plurality of third division differential maps by dividing the second division differential maps; and
   a third slave unit configured to implement a tactile display according to the entire tactile pixels based on the third division differential maps,
   wherein, when a number of pixels of entire tactile pixels is N*I, a number of pixels of the first division differential map is N*J, a number of pixels of the second division differential map is K*J, N, I, J, and K are natural numbers, I is greater than J, and N is greater than K.

2. The tactile display tablet of claim 1, wherein the third slave unit includes:
   a third slave substrate;
   a third slave port configured to receive the third division differential map from the second slave unit;
   a plurality of signal supply units configured to transmit a plurality of TULA drive signals divided from the third division differential map; and
   a plurality of TULA modules configured to implement a plurality of tactile pixels according to each of the TULA drive signals.

3. The tactile display tablet of claim 2, wherein the third slave unit includes:
   a TULA support configured to support a lower side of the TULA modules;
   a first fixing guide coupled to the TULA support and having a plurality of through-holes configured to guide a lower portion of a physical member for implementing the tactile pixels of the TULA module; and
   a second fixing guide disposed above the first fixing guide and having a plurality of through-holes configured to guide an upper portion of the physical member for implementing the tactile pixels of the TULA module.

4. The tactile display tablet of claim 3, wherein the fixing guide is formed on one side surface thereof with at least one first groove and an opposite side surface thereof with at least one first protrusion having a shape corresponding to a shape of the first groove, and
   the second fixing guide formed on one side surface thereof with at least one second groove, and an opposite side surface thereof with at least one first protrusion having a shape corresponding to a shape of the first groove,
   wherein two adjacent first fixing guides are attached to and detached from each other by the first groove and the first protrusion, and
   two adjacent second fixing guides are attached to and detached from each other by the second groove and the second protrusion.

5. The tactile display tablet of claim 2, wherein the TULA module includes:
   a plurality of pin drive modules;
   a pin drive module fixing portion configured to support the pin drive modules; and
   a pin drive signal supply unit supported by the pin drive module fixing portion to receive the TULA drive signal and transmit a pin drive signal to each of the pin drive modules based on the TULA drive signal.

* * * * *